(12) United States Patent
Akaike et al.

(10) Patent No.: US 7,603,100 B2
(45) Date of Patent: Oct. 13, 2009

(54) HIGH-FREQUENCY RADIO APPARATUS

(75) Inventors: Kazuo Akaike, Saitama (JP); Makoto Okamoto, Saitama (JP); Tsutomu Yamakawa, Saitama (JP); Minoru Fukuda, Saitama (JP); Kozo Ono, Saitama (JP); Nobuo Tsukamoto, Tokyo (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 719 days.

(21) Appl. No.: 11/230,756

(22) Filed: Sep. 19, 2005

(65) Prior Publication Data
US 2006/0063489 A1    Mar. 23, 2006

(51) Int. Cl.
H04B 1/16 (2006.01)

(52) U.S. Cl. .................. 455/334; 455/343.1; 455/127.1; 455/574

(58) Field of Classification Search .................. 455/334, 455/343.1, 550.1, 574, 573, 127.1, 127.5; 370/311
See application file for complete search history.

(56) References Cited

U.S. PATENT DOCUMENTS

| | | | |
|---|---|---|---|
| 4,053,717 A | | 10/1977 | Snider |
| 5,666,355 A | * | 9/1997 | Huah et al. .................. 370/311 |
| 6,775,531 B1 | * | 8/2004 | Kaewell et al. .......... 455/343.1 |
| 2002/0042292 A1 | | 4/2002 | Hama |
| 2004/0147277 A1 | * | 7/2004 | Kaewell et al. ............. 455/522 |

FOREIGN PATENT DOCUMENTS

| | | |
|---|---|---|
| JP | 02-024640 | 1/1990 |
| JP | 04-361434 A | 12/1992 |
| JP | 10-190551 A | 7/1998 |
| JP | 11-284482 A | 10/1999 |
| JP | 11-284484 A | 10/1999 |
| JP | 2000-124738 A | 4/2000 |
| JP | 2000-232332 A | 8/2000 |
| JP | 2000-261366 A | 9/2000 |
| JP | 2001-244834 A | 9/2001 |
| JP | 2001-274854 A | 10/2001 |
| JP | 2003-069656 A | 3/2003 |
| WO | 8500481 A1 | 1/1985 |

OTHER PUBLICATIONS

European Search Report for International Application No. PCT/JP2004/003494, mailed Aug. 26, 2008.

* cited by examiner

*Primary Examiner*—Tony T Nguyen
(74) *Attorney, Agent, or Firm*—Ingrassia Fisher & Lorenz, P.C.

(57) ABSTRACT

A high-frequency wireless communication device is provided that is capable of enlarging the range of communication by enhancing reception sensitivity while avoiding mutual interference. The device comprises an antenna filter and a direct detection type reception mechanism connected to the antenna filter. A crystal filter is used as the antenna filter. A crystal chip constituting the crystal filter and an IC chip into which the reception mechanism is integrated are housed in a single modular container to configure a high-frequency wireless module.

20 Claims, 6 Drawing Sheets

HIGH-FREQUENCY RADIO APPARATUS

CROSS-REFERENCES TO RELATED APPLICATIONS

This application claims priority to PCT Patent Application No. PCT/JP2004/003494 entitled "High Frequency Radio Apparatus", filed Mar. 16, 2004, which claims priority to Japanese Patent Application No. 2003-76153, filed on Mar. 19, 2003 and Japanese Patent Application No. 2004-21987, Filed on Jan. 29, 2004.

FIELD OF THE INVENTION

The present invention relates generally to a high frequency radio apparatus and, more particularly, to an apparatus and method for high-frequency wireless communication that is suitable, for instance, for short-distance wireless communication.

In this document, the term "short-distance wireless communication" generically represents a method and apparatus utilizing a low-power carrier band signal that is not subject to legal restriction, and is used for wireless communication over a relatively short distance, such as keyless entry control, wireless target monitoring, and wireless control.

BACKGROUND OF THE INVENTION

Keyless entry control systems are well known examples of short-distance wireless communication systems. The keyless entry control system exercises wireless control, for instance, over vehicle door opening/closing, engine startup, and engine shutdown from a distance of several meters to several tens of meters. The system comprises a stationary wireless communication device, which is mounted in a vehicle, and a portable wireless communication device, which is carried by the user.

FIG. 8 is a block diagram that shows how a conventional keyless entry control system of the above-mentioned type is configured. In the example shown in FIG. 8, a transmitter 1, which is a wireless communication device carried by the user, modulates a carrier band signal having a VHF or higher frequency with an identification code for the transmitter 1 and an instruction signal for door opening/closing or the like, and transmits the modulated signal from an antenna 5 to a receiver 2, which is a stationary wireless communication device.

The receiver 2 includes an antenna filter for filtering the received carrier band signal to remove unnecessary frequency components. In the keyless entry control system, a 315 MHz high-frequency signal is used (hereinafter referred to as the "communication frequency"). Therefore, a surface acoustic wave filter 6 (hereinafter referred to as a SAW filter), which is suitable for use at high frequency, is generally employed as the antenna filter for the receiver 2.

According to Radio Law Enforcement Regulations, the electric field strength prevailing at a distance of 3 m from the transmitter 1 is not restricted if it is 500 μV/m. Since the carrier band signal is transmitted at low power, the receiver 2 uses a high-frequency preamplifier 14 to raise the received carrier band signal to a specified power level and demodulates the identification code and the instruction signal by subjecting the amplified carrier band signal to direct detection by reception mechanism 4. The instruction signal is then used to control the vehicle's drive mechanisms to, for instance, open/close a door.

The reception mechanism 4 can be integrated into an integrated circuit (IC). Therefore, the receiver 2 can be reduced in size by mounting the reception mechanism and SAW filter on a circuit board as so-called discrete parts.

In general, the relationship between the noise level N (W) and bandwidth B (Hz) of a receiver that is directly detected by an antenna filter is uniquely determined by Equation (1) below:

$$N = KTBF \qquad (1)$$

In Equation (1), the symbol K represents Boltzmann's constant ($1.38 \times 10^{-23}$); T, absolute temperature (degrees K); and F, noise index. Since Boltzmann's constant K, absolute temperature T, and noise index F are fixed values, the noise level N depends on the antenna filter's bandwidth B. In other words, the wider the bandwidth B of the employed antenna filter, the higher the noise level N and thus the lower the signal component reception sensitivity. Further, since the bandwidth B is wide, mutual interference with unnecessary extraneous signals is likely to occur, thereby causing improper operation.

FIG. 9 shows a frequency-attenuation characteristic that prevails when the SAW filter 6 is used as the antenna filter. It indicates that the bandwidth in a 3 dB attenuation region W1 is approximately 1000 kHz under normal conditions. If, for instance, the identification code bit rate is 1.2 kbps, the bandwidth required for communication (W2) is 4 kHz or smaller.

As described above, the SAW filter 6 provides a very wide bandwidth (approximately 1000 kHz) in marked contrast to the bandwidth required for communication (4 kHz). Therefore, it is substantially impossible to raise the signal component reception sensitivity by lowering the noise level N as is indicated by Equation (1). Thus, the range for establishing communication between the receiver 2 and the transmitter 1 (e.g., communication distance) is limited.

Further, the bandwidth B of the SAW filter 6 cannot be narrowed. It is therefore difficult to effectively prevent mutual interference between an extraneous signals and a communication frequency (i.e., the signal frequency required for communication), eliminate image frequencies for the communication frequency, and improve communication quality. To achieve image frequency elimination, it is necessary that the reception mechanism 4 incorporate an image suppressor function. Consequently, it is impossible to simplify the configuration of the reception mechanism 4 and reduce the power consumption.

The SAW filter 6 is relatively expensive because it is made by mounting a plurality of electrodes on a crystal plate surface. Further, the SAW filter 6 needs to be mounted on a set circuit board separately from the reception mechanism 4, which is integrated into an IC. Therefore, the size reduction of the receiver 2 is somewhat limited.

In a short-distance wireless communication system such as the aforementioned keyless entry control system, particularly in a system where a SAW filter 6 is used as an antenna filter, the single antenna filter is not used for both transmission and reception. One major reason is that the transmission frequency f1 and reception frequency f2, used for communication, differ from each other even when the same carrier band signal is used. Another major reason is that when a high-frequency signal that has not been filtered by the SAW filter 6 is amplified, the carrier band signal level outside the bandwidth required for communication increases to adversely affect the SAW filter 6 (e.g., the operation becomes unstable so that the specified filter characteristic is not obtained).

Therefore, it would be desirable to provide a small-size, high-frequency wireless communication device that is capable of enlarging the range within which communication can be established, effectively avoiding mutual interference with extraneous signals, and easily achieving image frequency suppression.

In view of the relationship between noise level and bandwidth, which is indicated by Equation (1) above, the present invention provides a high-frequency wireless communication device that employs a crystal filter as an antenna filter. The bandwidth provided by the crystal filter is much narrower than that provided by a conventional SAW filter. When the crystal filter is used, the bandwidth for carrier band signal passage can be reduced to 20 kHz or less whereas the SAW filter provides a bandwidth of approximately 1000 kHz. According to the law of energy conservation, the receiving-end reception sensitivity can therefore be dramatically raised in relation to the same energy (electrical power for transmission).

Conventionally, the crystal filter has been frequently used with a wireless communication device that is based on relatively low frequencies including a shortwave band. However, the use of the crystal filter with a VHF band (30 to 300 MHz) or UHF band (300 MHz to 3 GHz) has not been conceived. One major reason for this is that an upper limit is imposed on the range of the crystal filter implementation as indicated, for instance, in FIG. 7 on page 23 of "Crystal Device General Description and Application" (Quartz Crystal Industry Trade Association of Japan, March 2002). It was believed that the SAW device (SAW filter) developed for a high-frequency band is the only applicable antenna filter for a keyless entry control system for use at a VHF or higher frequency.

However, due to improvements in manufacturing and processing technologies for crystal chips comprising the crystal filter the range of frequencies applicable to the crystal filter has been enlarged. Further, crystal can be used not only at a fundamental frequency but also at an overtone frequency, which is an odd-numbered multiple of the fundamental frequency. Thus, it has been found that the crystal filter (crystal chip) can also be used as an antenna filter at VHF and higher frequencies.

BRIEF SUMMARY OF THE INVENTION

There has been provided a high-frequency wireless communication device that comprises a crystal filter for filtering a carrier band signal that has a VHF or higher frequency and is received by an antenna, and a reception mechanism for performing a direct-detection reception process on the carrier band signal filtered by the crystal filter.

The direct-detection type high-frequency wireless communication device has a simpler circuit structure than a superheterodyne type, which converts the frequency of a received signal to an intermediate frequency and then detects the intermediate frequency. Therefore, the direct-detection type high-frequency wireless communication device can be rendered smaller in size. The high-frequency wireless communication device according to the present invention is advantageous compared to a conventional high-frequency wireless communication device when the carrier band signal reaches the antenna after being transmitted from another wireless communication device at low power that is not subject to legal restriction. Although the employed transmission power is low, the range of communication can be enlarged because the reception sensitivity is raised as described earlier by the action of the crystal filter. For power consumption reduction purposes, an intermittent carrier band signal is used.

The reception mechanism may include a local oscillator, which has a crystal oscillator for generating a high-frequency local signal for direct detection, and a detection circuit, which uses the high-frequency local signal to achieve direct detection.

In the above instance, it is preferred that the crystal filter and crystal oscillator be positioned in operating environments that are substantially the same in terms of their temperature characteristics and aging characteristics. As described earlier, the bandwidth of the crystal filter may be as narrow as 20 kHz. Therefore, if the frequency changes due to an ambient temperature change or aging (changes in the characteristic) resulting from prolonged use, difficulties may arise when an attempt is made to achieve direct detection with a high-frequency local signal that is generated from the crystal oscillator. Therefore, the crystal filter and crystal oscillator are preferably located in operating environments that are substantially similar in terms of the above-mentioned characteristics. Consequently, frequency changes in the crystal filter and crystal oscillator are substantially equal and in the same direction. This may be achieved, for instance, by enclosing the crystal filter and crystal oscillator in a single modular container that is configured to provide the crystal filter and crystal oscillator with substantially similar temperature characteristics.

There is also provided a high-frequency wireless communication device that comprises a transmission/reception mechanism that uses a single crystal filter for filtering a signal that has a VHF or higher frequency and is received by an antenna and a signal that has a VHF or higher frequency and is transmitted from the antenna to another wireless communication device at low power.

The above high-frequency wireless communication device can use a single crystal filter for both transmission and reception, simplifying the structure, and providing enhanced versatility by making use of the narrow bandwidth characteristics of the crystal filter, and achieves image suppression itself. In the case of reception, the image frequencies can be properly removed when passing through the crystal filter by, for instance, adjusting the amplifier gain for an unfiltered high-frequency signal. Therefore, the use of an image suppressor or like device in a subsequent signal processing circuit is rendered unnecessary, and the amount of power consumption can be reduced accordingly. In the case of transmission, the image frequencies are suppressed by the crystal filter, and then a high-frequency amplifier positioned at a final stage provides amplification to a specified power level. As a result, it is possible to prevent amplification of the image frequencies.

When a single crystal filter is to be used for both transmission and reception, the high-frequency wireless communication device may include a local oscillator that is equipped with a crystal oscillator for generating a high-frequency local signal for direct detection and modulation; a detection circuit for directly detecting a signal frequency prevailing after frequency conversion by the high-frequency local signal; a modulation circuit for performing modulation while permitting the high-frequency local signal to subject a signal frequency to frequency conversion; a first signal conversion circuit for converting an analog signal generated by the detection circuit to a digital signal; a second signal conversion circuit for converting an input digital signal to an analog signal and introducing the resulting analog signal to the modulation circuit; and a signal processor including a switch circuit for changing the direction of signal transmission within the wireless communication device.

The high-frequency amplifier and signal processor may operate in accordance with and coordinate with a processor and software residing in a predetermined storage area or firmware whose processing operations are predefined It may be configured as a software radio that performs a process for establishing wireless communication with an external device when a predetermined procedure is followed, and allow its operations to be subsequently altered. The contents of the software or firmware can be altered to establish wireless communication with a remote party that uses a different communication procedure or frequency. Therefore, various wireless communication methods can be supported by a single high-frequency wireless communication device.

Further, the crystal filter is much smaller and more lightweight than the SAW filter. Therefore, the crystal filter and software radio can be enclosed in a single modular container. The crystal filter and crystal oscillator are then placed in operating environments that are substantially the same in terms of their temperature and other characteristics. In addition, the high-frequency wireless communication device can be reduced in size and rendered suitable for volume production.

There is also provided a high-frequency wireless communication device that comprises a signal processor for generating a carrier band signal that has a VHF or higher frequency and is modulated with predetermined data; a crystal filter for filtering the carrier band signal generated by the signal processor; and a high-frequency amplifier for amplifying the carrier band signal, which is filtered by the crystal filter, at low power, and introducing the amplified signal to an antenna.

For example, the signal processor intermittently generates a carrier band signal that has a VHF or higher frequency and is subjected to spread spectrum modulation with a spread code predefined for a remote party for communication after the above-mentioned data is subjected to primary modulation.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
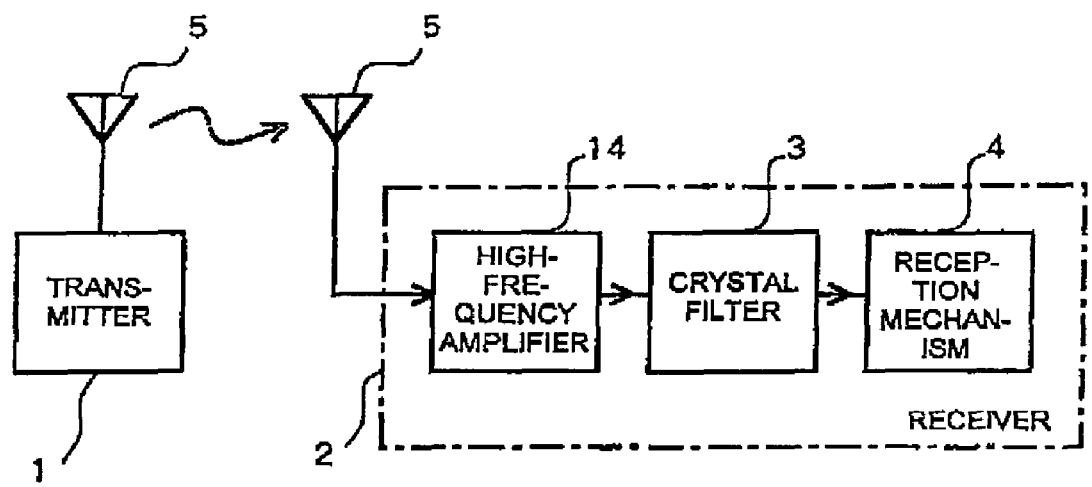
FIG. 1 is a block diagram illustrating one embodiment of a high-frequency wireless communication device according to the present invention.
Figure 8:
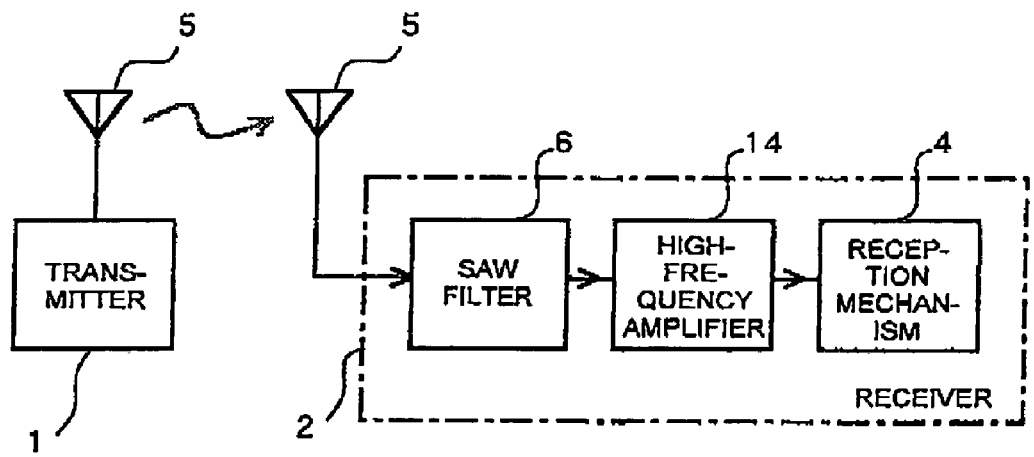
FIG. 8 is a block diagram illustrating a conventional receiver for short-distance wireless communication.
Figure 9:
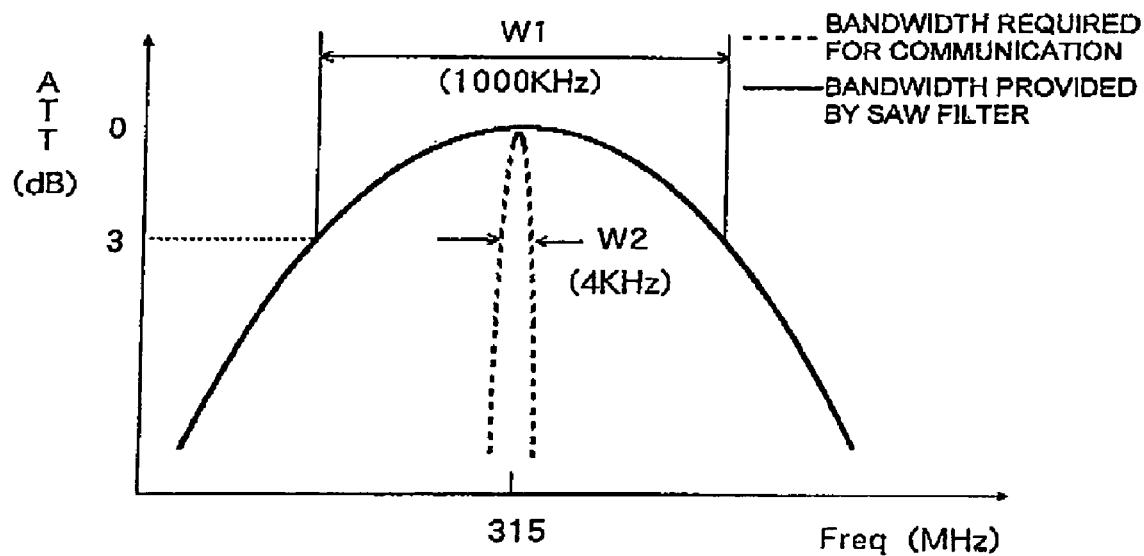
FIG. 9 shows a frequency-attenuation characteristic curve of a SAW filter.

FIG. 1 is a block diagram of a high-frequency wireless communication device for use as a receiver according to the present invention. In FIGS. 1 and 8, elements having virtually the same functions are identified by the same reference numerals for explanation purposes.

The present embodiment of a receiver 2, which is shown in FIG. 1, uses a direct detection method that is not dependent on a subcarrier. The receiver 2 includes a high-frequency amplifier (preamplifier) 14, a crystal filter 3, and a reception mechanism 4. The high-frequency amplifier 14 and the reception mechanism 4 are integrated into an IC chip. The IC chip and the crystal filter 3 are housed in a one-piece modular container. This IC chip is hereinafter referred to as an RF (radio frequency) IC chip.

The RF IC chip includes, for instance, a processor and a memory area. The memory area stores software (program, parameters, and data) that the processor reads to perform a digital signal process for wireless communication with a transmitter 1. In this sense, the RF IC chip is a form of software radio. To establish communication with a remote party that uses a different wireless communication procedure or frequency, the software is reprogrammable using, for example, a data writer (e.g., ROM writer), which is not shown, even after RF IC chip manufacture.

In addition to reprogrammable software, firmware whose operating steps are predetermined, such as a printed wiring board or a DSP (digital signal processor), may be used as the RF IC chip 7. When firmware is to be used, it is preferred that the firmware be replaceable depending on the intended use.

The reception mechanism 4 may be configured in any manner. However, if it includes a local oscillator having a crystal oscillator that generates a high-frequency local signal for direct detection, the elements of the local oscillator excluding the crystal oscillator are incorporated into the RF IC chip while the crystal oscillator and the RF IC chip are enclosed in the above-mentioned modular container. The crystal filter 3 and crystal oscillator are then positioned in operating environments that are substantially the same in terms of their temperature characteristics and aging characteristics. Consequently, even when the ambient temperature for the crystal filter 3 rises or the frequency changes due to crystal chip aging, no difficulties result because the crystal filter and crystal oscillator are equally impacted at the time of detection. If with respect to aging characteristic, the electrode, adhesive member, and other noncrystalline materials used for the crystal filter 3 and crystal oscillator should likewise be equally impacted.

When, for instance, the frequency band for use with a keyless entry control system is approximately 315 MHz, the size of a crystal chip for the crystal filter 3 and crystal oscillator may be as small as 1 mm square. Therefore, the crystal filter 3 and crystal oscillator can be easily housed in a modular container. As a result, the high-frequency wireless communication device can readily be reduced in size and rendered suitable for volume production.

Figure 2:
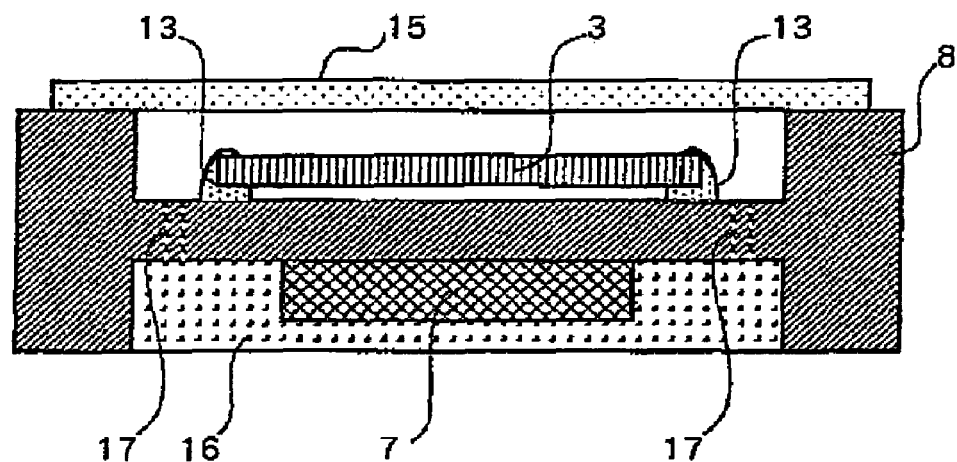
FIG. 2 is a cross-sectional view illustrating how the high-frequency wireless communication device shown in FIG. 1 is housed in a modular container.

As indicated by a cross-sectional view presented in FIG. 2, the modular container includes a container main body 8 that is made of a multilayer ceramic material. However, any other material may be employed if it assures that the temperature and other characteristics of various parts housed in the container are substantially equal. The container main body 8 has an H-shaped cross section so that both of its surfaces have concave portions. The bottom surface of one concave portion of the container main body 8, which is formed as described above, is connected electrically and mechanically to the crystal filter 3 using a conductive adhesive 13 or the like. A cover 15 is installed over its opening by seam welding or the like. If the crystal oscillator is to be enclosed in the modular container, it is secured to the container main body 8 in the same manner as described above.

The RF IC chip 7 is secured to the bottom surface of the other concave portion of the container main body 8 by flip chip bonding or the like. The area around the RF IC chip 7 is usually filled with protective resin 16 to prevent the RF IC chip 7 from being displaced when the receiver 2 moves. The wiring connection between the electrode of the RF IC chip 7 and the electrode of the crystal filter 3 (and crystal oscillator) is made, for instance, via a through-hole 17. Terminals (not shown) for surface mounting are formed on the upper surface of a frame that forms the other concave portion.

Figure 3A:
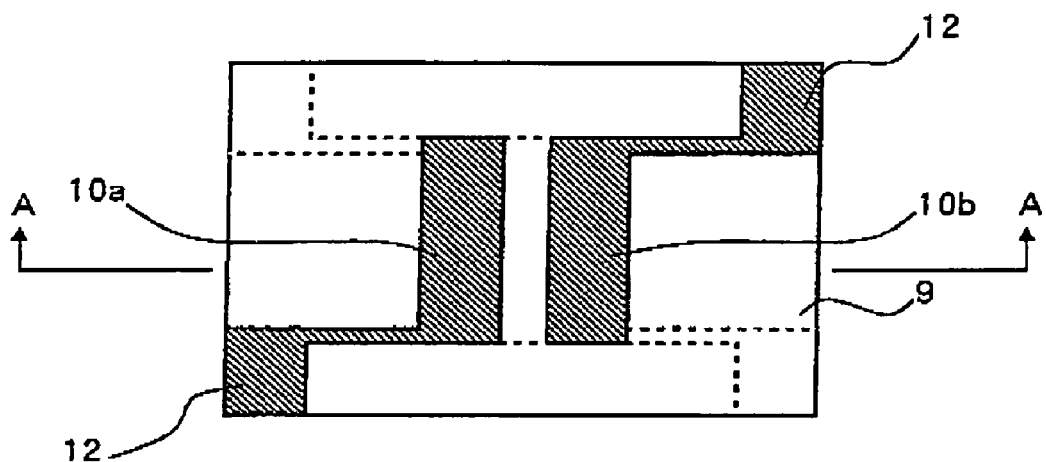
FIG. 3A is a plan view illustrating a crystal filter for use with a high-frequency wireless communication device according to the present invention.
Figure 3B:
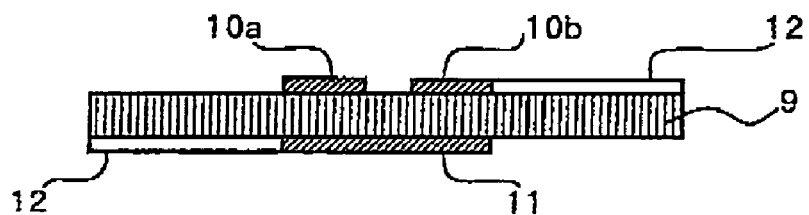
FIG. 3B is a cross-sectional view illustrating a crystal filter for use with a high-frequency wireless communication device according to the present invention.

FIG. 3A is a plan view of the crystal filter that is used in the present embodiment. FIG. 3B is a cross-sectional view of the crystal filter taken along line AA. The crystal filter 3 includes a crystal chip 9, which is, for instance, AT-cut. A pair of input/output electrodes 10a, 10b are mounted on one principal surface of the crystal chip 9. One common electrode is mounted on the other principal surface of the crystal chip 9. Lead-out electrodes 12 are diagonally extended from the input/output electrodes 10a, 10b and common electrode 11.

The AT cut is parallel to the crystal's X-axis and provided at an angle of 35 degrees, 15 minutes from the Z-axis. It is known that the resulting frequency-temperature characteristic is represented by a cubic curve and excellent over a wide temperature range. For example, a third-order overtone type, that is, a 100-130 MHz type, is used as the crystal filter 3. It is preferred that a commercially available 105 MHz type be used at 315 MHz.

Figure 4:
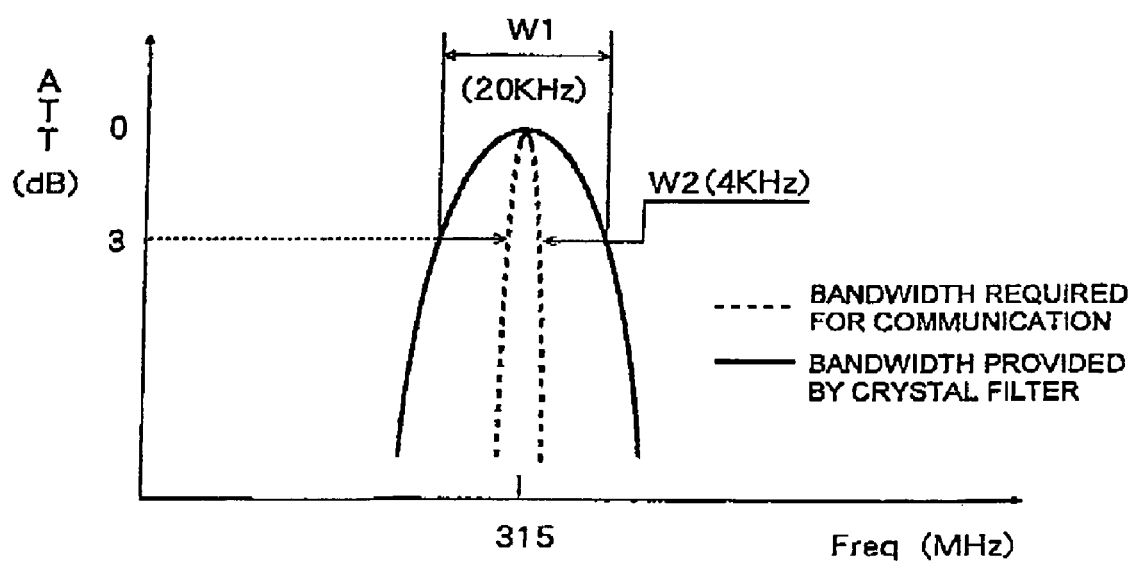
FIG. 4 shows a frequency-attenuation characteristic curve of a crystal filter.

When the receiver 2 is configured as described above, the bandwidth W1 within a 3 dB attenuation region of the crystal filter 3 is no more than 20 kHz as indicated by the frequency-attenuation characteristic curve in FIG. 4. This bandwidth is less than approximately ⅕ the bandwidth (approximately 1000 kHz) of the conventional SAW filter. In this instance, Equation (1) above indicates that the resulting noise level is reduced to approximately 1/50 when compared with the use of the SAW filter 6. The resulting reception sensitivity is 17 dB higher than (approximately 50 times as high as) that provided by the SAW filter 6. As a result, there is a wider range of communication over a short distance. Further, the bandwidth narrows so as to avoid interference from extraneous signals. In addition, image frequencies are properly suppressed to avoid erroneous operations. The crystal filter 3 and the RF IC chip 7 of the reception mechanism 4 are housed in the same modular container to facilitate downsizing.

In the present embodiment, the container main body 8 for the modular container has concave portions on both sides so that the crystal filter 3 and RF IC chip 7 are separately housed for integration. Alternatively, however, the crystal filter 3 and RF IC chip 7 may be housed together in only one concave side is concaved or may be housed in separate containers and joined together. The present embodiment also assumes the use of a third-order overtone type crystal filter 3. Alternatively, however, a fundamental frequency may be used. An overtone of any order is acceptable.

In the preceding embodiment, the high-frequency wireless communication device is used as the receiver 2. However, it is conceivable that a reply may be returned in response to a communication frequency received from the transmitter 1. Therefore, another embodiment in which the high-frequency wireless communication device is used for both transmission and reception will now be described.

Figure 5:
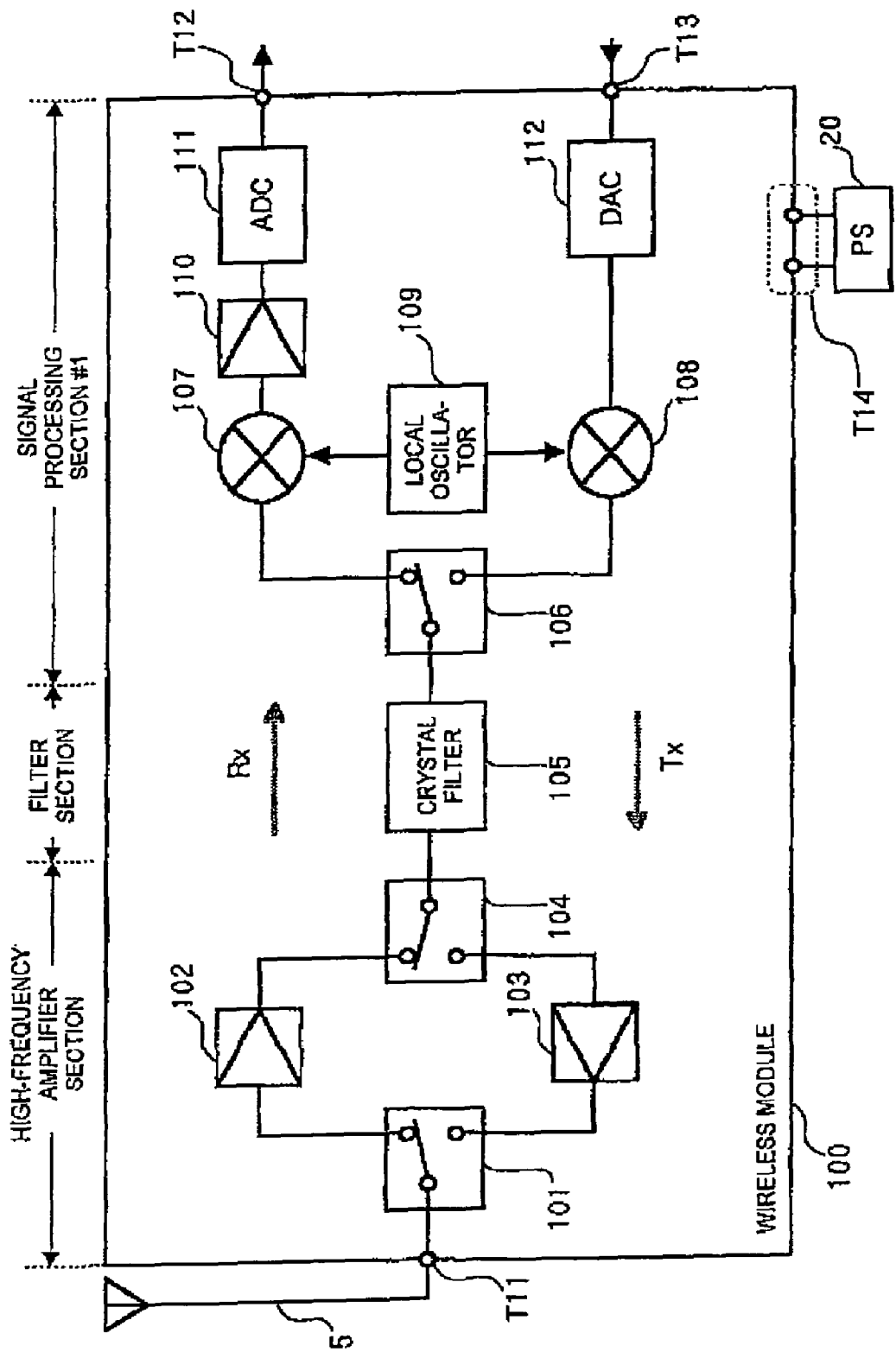
FIG. 5 is a block diagram illustrating another embodiment of a high-frequency wireless communication device according to the present invention.

FIG. 5 illustrates the configuration of a wireless module 100 in which a high-frequency wireless communication device for transmission and reception is modularized and housed. The wireless module 100 roughly comprises a high-frequency amplifier section, a filter section, and a signal processing section (#1).

The high-frequency amplifier section includes a low-noise amplifier 102 for amplifying a carrier band signal that is received via an antenna connection terminal T11, and a power amplifier for amplifying the power level of a carrier band signal supplied via the antenna connection terminal T11 to a specified value.

The filter section comprises a crystal filter 105. This crystal filter 105 is the same as the aforementioned crystal filter 3. For example, the center frequency of its bandwidth for communication use is 315 MHz, and the bandwidth is 20 kHz. The bandwidth can be narrowed to 20 kHz or less by the crystal filter 105. Therefore, if, for instance, a center frequency of approximately 100 kHz is to be directly detected, image frequencies can be properly eliminated by the crystal filter 105 by adjusting the gain of the low-noise amplifier 102 to a low level (a gain of approximately 15 dB) that reduces the amount of distortion. This ensures that the signal processing circuitry at a later stage, including a detection circuit 107, does not require an image suppressor or the like. When the gain of the high-frequency amplifier section 103 is adjusted so as to obtain low power, the crystal filter 105 can be used for both reception and transmission without causing any problem. It is also possible to use the same frequency for transmission and reception by using intermittent waves for both transmission and reception. In this manner, the structure of the signal processing circuitry for the high-frequency module can be simplified to reduce the amount of power consumption.

As mentioned earlier, conventional high-frequency wireless communication devices require two antenna filters because they cannot use an antenna filter for both transmission and reception. In any case, if the SAW filter 6 is used as an antenna filter, image frequencies will be received because of a wide bandwidth. Therefore, the signal processing circuitry requires the use of an image suppressor. This inevitably results in a more complicated circuit configuration and increased power consumption.

The signal processing section (#1) includes a detection circuit 107 for exercising a direct detection method to achieve detection at the time of reception, a modulation circuit 108 for providing direct modulation at the time of transmission, a local oscillator 109 for generating the high-frequency local signal to be supplied to the detection circuit 107 and modulation circuit 108, an intermediate frequency amplifier 110 for amplifying an intermediate frequency signal prevailing after detection, an analog-to-digital converter (ADC) 111 for converting the amplified intermediate frequency signal to a digital value and outputting it to a digital output terminal T12, a digital-to-analog converter (DAC) 112 for receiving a digital signal input from a digital input terminal T13 and converting it to an analog signal, and transmission/reception changeover switches 101, 104, and 106 for selectively changing the direction of signal transmission.

Strictly speaking, the crystal oscillator generates a high-frequency local signal having a frequency (=315 MHz−49.152 kHz) that is equal to the difference between the communication frequency and intermediate frequency. It is preferred that a crystal chip having the same characteristics as the crystal chip for the crystal filter 105 be employed. When a frequency of approximately 49 kHz is used, a signal processing circuit (e.g., modulation/demodulation circuit), for instance, can perform a modulation/demodulation process at a low clock frequency. Therefore, power consumption can be reduced.

The transmission/reception changeover switches 101, 104, and 106 open and close at the same time by means of a control circuit that is not shown. More specifically, the switches turn ON when the associated binary signal takes on one value, and turns OFF when the signal takes on the other value. In the ON state, for example, the high-frequency amplifier section and signal processing section operate as a receiver. In the OFF state, on the other hand, the high-frequency amplifier section and signal processing section operate as a transmitter. Therefore, a single crystal filter can be used to exercise a transmission antenna filter function and reception antenna filter function. The power to the wireless module 100 is supplied from a power supply 20, which is connected to a power supply terminal T14.

The electronic circuitry for the high-frequency amplifier section and signal processing section may comprise the aforementioned RF IC chip (software radio). In the RF IC chip, the signal processing operation timing for the above sections may be approximately 65 ksp (kilo samples per second), which is based on a clock signal output from a clock oscillator (not shown) that generates a clock signal of approximately 32 kHz (32.768 kHz precisely). At present, this clock oscillator, which generates a clock signal of approximately 32 kHz, is mass-produced as the most popular oscillation circuit. It is therefore inexpensive and capable of contributing toward cost reduction of the wireless module 100.

At the time of mounting, the RF IC chip, the crystal oscillator contained in the local oscillator 109, and the crystal filter 105 are enclosed, for instance, in a modular container made of a multilayer ceramic material as shown in FIG. 2. The crystal oscillator and crystal filter 105 are particularly positioned in operating environments that are substantially the same in terms of the temperature characteristics and aging characteristics of crystal chips that are primary constituents. Further, virtually the same aging characteristics result when crystal chips having the same characteristics are contained in the crystal oscillator and crystal filter 105, for example, when the electrode, adhesive member, and other noncrystalline materials used for the crystal oscillator and crystal filter 105 are the same. Consequently, even when the ambient temperature for the crystal filter 105 rises or the frequency changes due to aging, the influence of such phenomena can be mitigated because the frequency changes occur in the same direction at the time of detection and modulation.

The wireless module 100, which is configured as described above, receives a digital signal targeted for transmission from the digital input terminal T13. Therefore, the wireless module 100 can transmit a carrier band signal, which is modulated with the digital signal, to a remote party receiver. After the signal passes through the crystal filter 105, the transmission system amplifies the signal and then transmits it. Therefore, a low input level may be used for the crystal filter 105.

Further, the signal transmitted from a remote transmitter appears at the digital output terminal T12. Therefore, the received signal can be subjected to digital processing. Thus, it is possible to implement a wireless module 100 that is simple in structure, highly versatile, and mass producible.

The high-frequency wireless communication device according to the present invention can be expanded for both transmission and reception. For example, a signal processing section (signal processing section #2 in FIG. 6) can be added.

Figure 6:
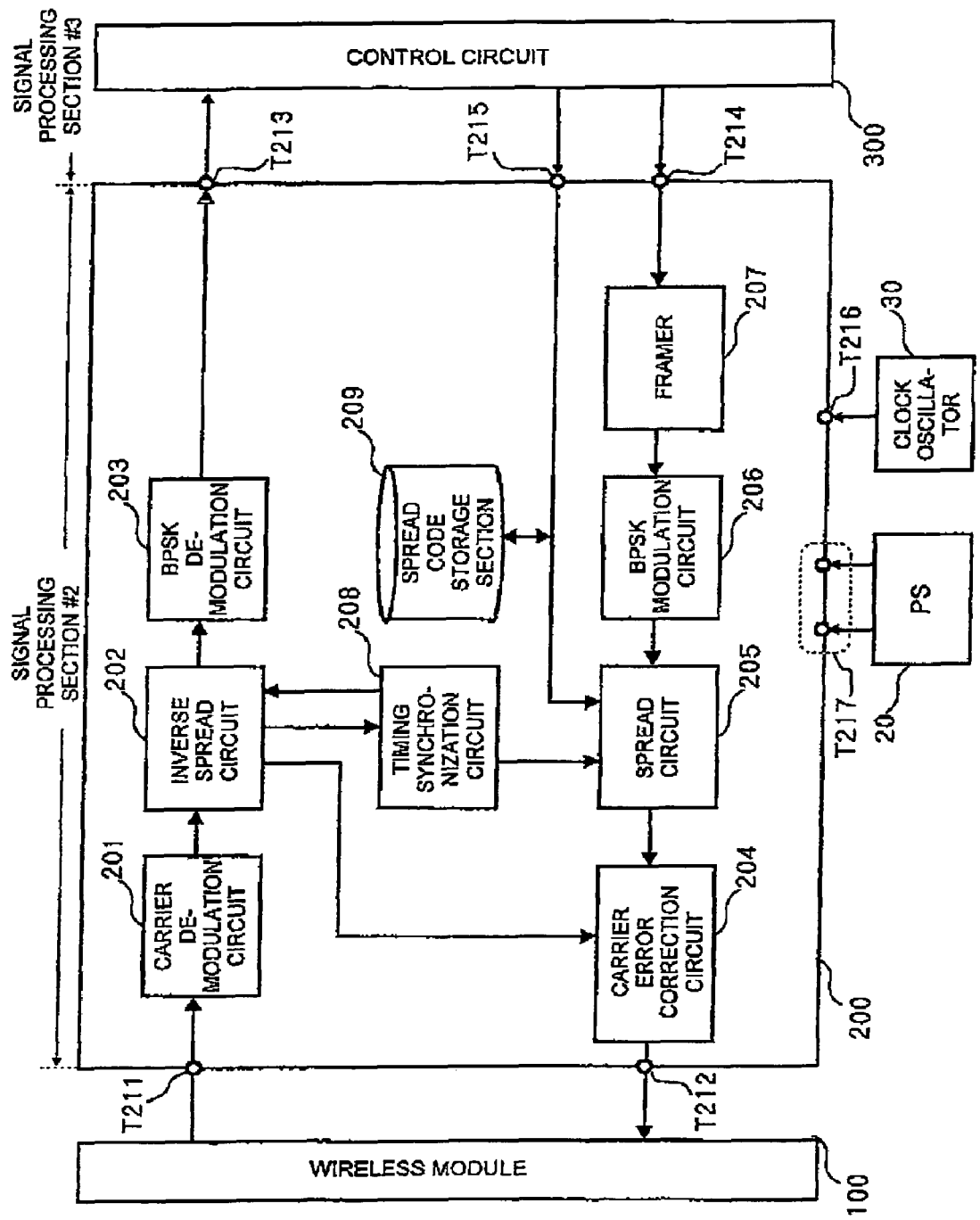
FIG. 6 illustrates the configuration of an IC chip that is mounted in a high-frequency wireless communication device or operated in coordination with a high-frequency wireless communication device.
Figure 7:
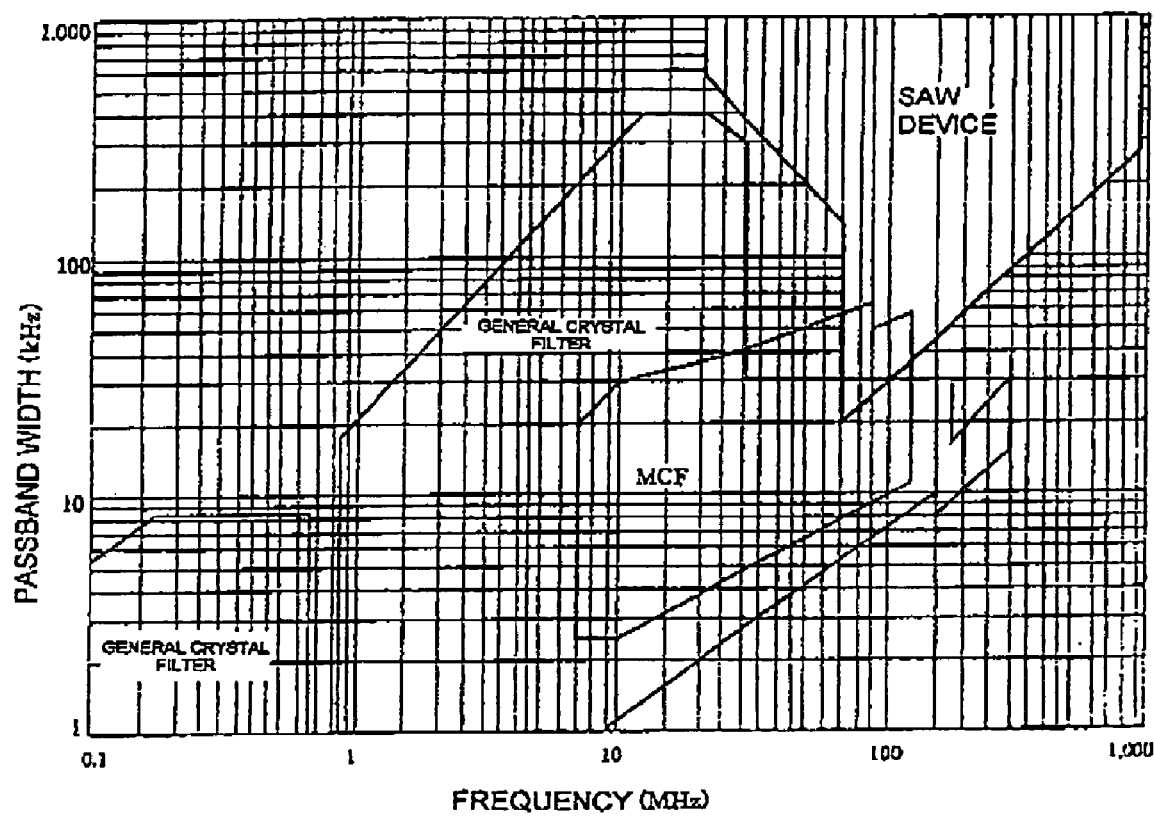
FIG. 7 is a chart illustrating the operating ranges of a crystal filter and a SAW device.

FIG. 6 illustrates a typical configuration of an IC chip that is obtained by extending the wireless module 100 shown in FIG. 5 to establish short-distance wireless communication based on the spread spectrum (SS) method. It is assumed that a spread code (pseudorandom signal) predefined for a remote party for communication is retained. This IC chip is also a kind of software radio. For explanation purposes, it is referred to as the BB (baseband) IC chip.

The SS method used by the present embodiment of the wireless module will be outlined before describing the configuration of the BB IC chip 200. At the time of transmission, the SS method transmits data after it is subjected to two-step modulation. In the first modulation sequence, a BPSK (binary phase shift keying) method, which is not susceptible to noise, is used to acquire a narrowband signal, that is, a signal having a frequency in the range used for communication. Next, the product of rapidly switching spread codes is determined to obtain an SS signal having a widened frequency band. This is due to the fact that the spectrum of a rapidly changing signal spreads. This process is called "secondary modulation" or "spread modulation".

At the time of reception, secondary demodulation (spread demodulation) is first performed to restore the spread-modulated data to its previous state. More specifically, the same spread code as for the transmitting end is multiplied by the received SS signal while synchronism with the transmitting end is achieved. This process is called an "inverse spread". The original narrowband signal is obtained when such an inverse spread is performed. Therefore, primary demodulation is finally performed to reproduce the data transmitted from the transmitting end. When the narrowband signal is multiplied once by the spread code, the signal is spread. When the signal is multiplied again by the same spread code at the receiving end, the original signal is recovered.

When different code systems are assigned to a plurality of remote parties for communication, communication can be simultaneously established using the same frequency band without causing interference with each other. The SS method establishes this type of wireless communication. However, if the spread code at the transmitting end is not in synchronism with the spread code at the receiving end or if the employed code systems do not significantly correlate with each other, the original narrowband signal cannot be obtained. As a result, only a low-power spectral density signal whose band is left spread is obtained. The SS method is suitable for short-distance wireless communication because it allows the communication quality to degrade only gradually when the number of simultaneously available wireless communication devices increases within the same frequency band.

To provide communication according to the above SS method, the BB IC chip 200 is configured, for instance, as shown in FIG. 6. More specifically, the reception system includes a carrier demodulation circuit 201 for demodulating a 48 kHz digital signal, which is entered from the wireless module 100 via a digital input terminal T211, an inverse spread circuit 202 for subjecting the above digital signal to secondary demodulation, and a BPSK demodulation circuit 203 for subjecting the resulting narrowband signal to primary demodulation and outputting the demodulated data to a control circuit 300 via a digital output terminal T213.

A control circuit 300 is connected to a drive mechanism for the target such as a vehicle door open/close mechanism. The control circuit 300 exercises drive control in accordance with the demodulated data.

A transmission system includes a framer 207 for framing the data entered from the control circuit 300 via a data input terminal T214 such as control notification data, a BPSK modulation circuit 206 for subjecting the resulting frame signal to primary modulation, a spread circuit 205 for performing secondary modulation using a spread code that is stored in a spread code storage section 209 and assigned to the local device, a carrier error correction circuit 204 for transmitting the secondary-modulated data and the instruction data for carrier band signal frequency correction at the time of transmission to the wireless module 100 via a data output terminal 212, and a timing synchronization circuit 208 for achieving timing synchronism for digital processing at the time of transmission/reception.

The carrier error correction circuit 204 detects the frequency difference (error) between a signal component contained in the received carrier band signal and the high-frequency local signal of the local device, records frequency difference data, which represents the detected frequency difference, into a predetermined memory, reads the frequency difference data from the memory when the signal to be transmitted to a remote party for communication is subjected to carrier modulation, and corrects the frequency of the local device's high-frequency local signal in accordance with the read frequency difference data. This ensures that the frequency of the carrier band signal transmitted from the local device is synchronized with the frequency of the received carrier band signal. Since a digital process is performed for generating the frequency difference data, the process is very simple when compared with an analog data process.

As is the case with the SS method, the carrier error correction circuit 204 can offer a very effective method when the transmitting and receiving ends are synchronized with each other for communication purposes. However, the carrier error correction circuit does not always have to be retained by both the transmitting end and receiving end. When the BB IC chip 200 is mounted in an access unit based on the SS method, it may be equipped with the carrier error correction circuit 204. When, on the other hand, the BB IC chip 200 is mounted in a subscriber unit, the output of the spread circuit 205 may be directly delivered to the data output terminal 212. Further, when the BB IC chip 200 is mounted in a subscriber unit, intermittent transmission may be used to reduce the amount of power consumption.

All sections operate in accordance with control signals that are entered from the control circuit 300 via a control terminal T215 in compliance with 32 kHz clock signals, which are generated by a clock oscillator 30 and entered via a clock input terminal T216. The power supply 20 is connected to a power supply terminal T217.

The signal processing section (#2) shown in FIG. 6 and the signal processing section (#1) shown in FIG. 5 can be integrated together. In such an instance, one power supply 20 and one clock oscillator 30 will suffice.

When the crystal filter is used for the wireless module according to the present invention, which is equipped with the signal processing sections shown in FIG. 5 and FIG. 6 and used under virtually the same conditions to establish short-distance communication with a wireless module that uses a SAW filter, the bandwidth of passing frequencies is significantly narrower, for example, 20 kHz. Therefore, when BPSK modulation and spread modulation, which are relatively immune to noise, are used, the resulting reception sensitivity is improved so that it is higher than provided by the use of the SAW filter by nearly 30 dB. Further, there is a significant increase in the number of channels (the number of allocated spread codes) that are within the same frequency band and can be simultaneously used without interference.

While the present invention has been described in terms of preferred embodiments, it will be readily apparent to those skilled in the art that the present invention is not limited to the use of the high-frequency wireless communication device according to the present invention in a keyless entry control system, and can be used for various wireless communications based on a short-distance communication method. More specifically, the present invention can be used for a wide variety of applications, including an industrial telecontrol device, illumination controller, construction work signaler, garage opener, game, facility security system, and residential security system. The high-frequency wireless communication device according to the present invention can also be used in other wireless communication methods that use VHF and higher frequencies to establish communication. Therefore, it will be readily apparent to those skilled in the art that the scope of the present invention is not limited to a short-distance communication method.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is

1. A high-frequency wireless communication device that functions as a receiver of a keyless entry control system, the device comprising:
   an antenna;
   a crystal filter coupled to the antenna for filtering a carrier band signal that has a VHF or higher frequency received by the antenna, wherein the carrier band signal includes an identification code that has been modulated onto the carrier band signal by a transmitter of the keyless entry control system; and
   a reception mechanism coupled to the crystal filter for performing a direct-detection reception process on the carrier band signal filtered by said crystal filter in order to obtain the identification code.

2. The high-frequency wireless communication device according to claim 1, wherein said carrier band signal reaches said antenna after being transmitted from another wireless communication device at low power.

3. The high-frequency wireless communication device according to claim 1, wherein said carrier band signal is an intermittent signal.

4. The high-frequency wireless communication device according to claim 1, wherein said reception mechanism comprises:
   a local oscillator comprising a crystal oscillator for generating a high-frequency local signal for direct detection; and
   a detection circuit, coupled to said local oscillator which uses the high-frequency local signal to achieve direct detection.

5. The high-frequency wireless communication device according to claim 4, wherein said crystal filter and said crystal oscillator are positioned in operating environments that are substantially the same in terms of their temperature characteristics and aging characteristics.

6. The high-frequency wireless communication device according to claim 4, wherein said crystal filter and said crystal oscillator are enclosed in a single modular container that is configured to provide said crystal filter and said crystal oscillator with substantially the same temperature characteristics.

7. A high-frequency wireless communication device having an antenna, the device comprising:
 a transmission/reception mechanism coupled to the antenna that includes
 a high frequency amplifier section,
 a transmission/reception changeover switch, and
 a single crystal filter, coupled to the high frequency amplifier section and to the Transmission/reception changeover switch, for filtering a signal that has a VHF or higher frequency and is received by said antenna and amplified by the high frequency amplifier section when the transmission/reception changeover switch is in a first state, and the single crystal filter also for filtering a signal that has a VHF or higher frequency that is amplified by the high frequency amplifier section and transmitted from said antenna to another wireless communication device at low power when the transmission/reception changeover switch is in a second state.

8. A high-frequency wireless communication device having an antenna, the device comprising:
 a transmission/reception mechanism coupled to the antenna that uses a single crystal filter for filtering a signal that has a VHF or higher frequency and is received by said antenna and a signal that has a VHF or higher frequency that is transmitted from said antenna to another wireless communication device at low power, wherein said transmission/reception mechanism comprises:
  a local oscillator comprising a crystal oscillator for generating a high-frequency local signal for direct detection and modulation;
  a detection circuit coupled to said local oscillator for directly detecting a signal frequency prevailing after frequency conversion by said high-frequency local signal;
  a modulation circuit coupled to said local oscillator for performing modulation while permitting said high-frequency local signal to subject the signal frequency to frequency conversion;
  a first signal conversion circuit coupled to said detection circuit for converting an analog signal generated by said detection circuit to a digital signal;
  a second signal conversion circuit coupled to said modulation circuit for converting an input digital signal to an analog signal and introducing the resulting analog signal to said modulation circuit; and
  a signal processor coupled to said detection circuit and to said modulation circuit including a switch circuit for changing the direction of signal transmission within the wireless communication device.

9. The high-frequency wireless communication device according to claim 8, wherein said signal processor operates in accordance with coordination between a processor and software residing in a predetermined storage area or firmware whose processing operations are predefined, and serves as a software radio.

10. The high-frequency wireless communication device according to claim 9, wherein said software radio subjects said input digital signal to BPSK modulation at the time of transmission, and subjects a digital detection output signal, which is derived from conversion, to an inverse spread and performs a BPSK demodulation process at the time of reception.

11. The high-frequency wireless communication device according to claim 10, wherein said software radio detects a frequency difference between a signal component contained in a received carrier band signal and a high-frequency local signal of the local device, records in a predetermined memory the frequency difference data representing the detected frequency difference, reads the frequency difference data from the memory when the signal to be transmitted is subjected to carrier modulation, and performs a process for adjusting the frequency of the high-frequency local signal of the local device in accordance with the read frequency difference data.

12. The high-frequency wireless communication device according to claim 9, further comprising a clock oscillator circuit and wherein said carrier band signal is a signal having a frequency higher than 300 MHz, and wherein said local oscillator generates a high-frequency local signal whose frequency differs by approximately 49 kHz from the frequency of said carrier band signal, and wherein said software radio performs an approximately 65 ksp (kilo samples per second) signal process with a clock signal output from said clock oscillator circuit that generates a clock signal of approximately 32 kHz.

13. The high-frequency wireless communication device according to claim 8, wherein said crystal filter and said crystal oscillator are positioned in operating environments that are substantially the same in terms of their temperature characteristics and aging characteristics.

14. The high-frequency wireless communication device according to claim 8, wherein said crystal filter and said signal processor are housed in a single modular container.

15. A high-frequency wireless communication device comprising:
 a signal processor for generating a carrier band signal that has a VHF or higher frequency and is modulated with predetermined data;
 a crystal filter coupled to said signal processor for filtering the carrier band signal generated by said signal processor; and
 a high-frequency amplifier coupled to said crystal filer for amplifying the carrier band signal, which is filtered by said crystal filter, at low power that is not subject to legal restriction, and for introducing the amplified signal to an antenna.

16. The high-frequency wireless communication device according to claim 15, wherein said signal processor intermittently generates a carrier band signal that has a VHF or higher frequency and is subjected to spread spectrum modulation with a spread code predefined for a remote party for communication after said data is subjected to primary modulation.

17. The high-frequency wireless communication device according to claim 16, wherein said high-frequency amplifier, said crystal filter, and said signal processor are housed in a single modular container.

18. A high frequency wireless communication method, comprising:
 generating a high-frequency local signal;
 detecting a frequency prevailing after frequency conversion by the high-frequency local signal to produce an output signal;

modulating an input signal while permitting the high-frequency local signal to frequency convert the input signal;

converting the output signal to a digital signal;

converting the modulated signal to an analog signal; and changing the direction of signal transmission to achieve both transmitting and receiving.

19. The method of claim 18 further comprising subjecting the input signal to BPSK modulation.

20. The method of claim 18 further comprising:

determining the difference between the high-frequency local signal and a received carrier band signal;

recording frequency difference data in a memory;

reading the frequency difference data when a signal to be transmitted is subjected to carrier modulation; and adjusting the frequency of the high-frequency local signal in accordance with the read frequency difference data.

* * * * *

UNITED STATES PATENT AND TRADEMARK OFFICE
CERTIFICATE OF CORRECTION

| | | |
|---|---|---|
| PATENT NO. | : 7,603,100 B2 | Page 1 of 1 |
| APPLICATION NO. | : 11/230756 | |
| DATED | : October 13, 2009 | |
| INVENTOR(S) | : Kazuo Akaike et al. | |

It is certified that error appears in the above-identified patent and that said Letters Patent is hereby corrected as shown below:

On the Title Page, please add the following:

Item --(30) Foreign Application Priority Data

Mar. 16, 2004   PCT   PCT/JP2004/003494
Mar. 19, 2003   JP     2003-76153
Jan. 29, 2004    JP     2004-21987--.

Column 14, line 45, "filer" should be changed to --filter--.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,603,100 B2
APPLICATION NO. : 11/230756
DATED : October 13, 2009
INVENTOR(S) : Akaike et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 979 days.

Signed and Sealed this

Fifth Day of October, 2010

David J. Kappos
*Director of the United States Patent and Trademark Office*